United States Patent [19]

Choi

[11] Patent Number: 4,954,464
[45] Date of Patent: Sep. 4, 1990

[54] LOW TEMPERATURE SINTERED DIELECTRIC CERAMIC COMPOSITION

[75] Inventor: Won T. Choi, Seoul, Rep. of Korea
[73] Assignee: Goldstar Co., Ltd., Seoul, Rep. of Korea
[21] Appl. No.: 443,211
[22] Filed: Nov. 30, 1989

[30] Foreign Application Priority Data

Nov. 30, 1988 [KR] Rep. of Korea .......... 88-15835

[51] Int. Cl.$^5$ .............................................. C04B 35/49
[52] U.S. Cl. .................................... 501/134; 501/135; 501/136; 252/62.9
[58] Field of Search ............... 501/134, 135, 136; 252/62.9, 62.9 PZT

[56] References Cited

U.S. PATENT DOCUMENTS 4,601,988  7/1986  Sakabe et al. .................. 501/134
4,661,462  4/1987  Sakabe et al. .................. 501/134

FOREIGN PATENT DOCUMENTS 54-146812  11/1979  Japan .................. 501/134
61-068371   4/1986  Japan .................. 501/134
86-1758    10/1986  Rep. of Korea .
87-5418     6/1987  Rep. of Korea .
87-6597     7/1987  Rep. of Korea .
0504736     2/1976  U.S.S.R. ................. 501/134
1133248     1/1985  U.S.S.R. ................. 501/134

Primary Examiner—Mark L. Bell
Assistant Examiner—Anthony J. Green
Attorney, Agent, or Firm—Birch, Stewart, Kolasch & Birch

[57] ABSTRACT

A dielectric ceramic composition for sintering at a low temperature for use in capacitors which comprises a dielectric ceramic composition represented by the formula $(Pb(Zr_{\frac{1}{2}}Ti_{\frac{1}{2}})O_3)x$, $(Pb(Mn_{\frac{1}{2}}W_{\frac{1}{2}})O_3)y$ and $(Pb(Zn_{\frac{1}{2}}W_{\frac{1}{2}})O_3)z$, wherein x plus y plus z equal 1.

1 Claim, 2 Drawing Sheets

LOW TEMPERATURE SINTERED DIELECTRIC CERAMIC COMPOSITION

BACKGROUND OF THE INVENTION

Field of the Invention

The present invention relates to a dielectric ceramic composition for sintering at a low temperature and more particularly, to a composition of the formula $(Pb(Zr_{\frac{1}{2}}Ti_{\frac{1}{2}})O_3)x$, $(Pb(Mn_{\frac{1}{2}}W_{\frac{1}{2}})O_3)Y$ and $(Pb(Zn_{\frac{1}{2}}W_{\frac{1}{2}})O_3)z$, wherein x plus y plus z equal 1, which is sintered at a low temperature so as to be suitable as a material for laminated ceramic capacitors and has a high dielectric constant.

2. Description of the Prior Art

Various high dielectric constant ceramic compositions are well known in the art. Also, various high dielectric constant ceramic compositions have $BaTiO_3$, $BaSnO_3$, $CaTiO_3$, or $PbTiO_3$ as their principal components, with sintering temperature above 1,100° C. and dielectric constant of 2,000 at room temperature. Therefore, in the event of applying such compositions to a laminated capacitor, inclusion of a precious metal such as Ag-Pd, Au, Pt, or Pd in the compositions produces high corrosion resistance at the sintering temperature of above 1,100° C. for use as electrodes. Such dielectric ceramic compositions are disclosed in Japanese Patent No. 56-46641 which discloses a dielectric ceramic composition of a formula $((Ba_1-xCa_x)O)m$ and $(Ti_1-yZr_y)O_2$, wherein $1.005 \leq x \leq 1.03$, $0.02 \leq x \leq 0.22$, and $0 \leq y \leq 0.20$). However, the necessity of using a precious metal for electrodes introduces an element of economic disadvantage. To avoid such disadvantages, Korea Patent Laid-Open Nos. 87-5418 and 87-6597 and Korean Patent Publication No. 86-1758 disclose a small amount of addition impurities to the basic composition. However, the sintering temperature thereof still remains high such as above 1,000° C.

SUMMARY OF THE INVENTION

Therefore, it is an object of the present invention to provide a dielectric composition which will overcome the above-noted disadvantages.

Another object of the present invention is to provide a dielectric ceramic composition for sintering at a low temperature.

A further object of the present invention is to provide a composition of the formula $(Pb(Zr_{178}Ti_{178})O_3)x$, $(Pb(Mn_{178}W_{178})O_3)y$ and $(Pb(Zn_{178}W_{178})O_3)z$, wherein x plus y plus z equal 1, which is sintered at a low temperature so as to be suitable as a material for laminated ceramic capacitors and has a high dielectric constant.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood form the detailed description given hereinbelow and the accompanying drawings which are given by way of illustration only, and thus are not limitative of the present invention, and wherein.

DETAILED DESCRIPTION OF THE PREFERRED EMBODIMENTS

Referring now in detail to the drawings for the purpose of illustrating the preferred embodiments of the present invention, there is provided a dielectric ceramic composition which is represented by the formula, $(Pb(Zr_{178}Ti_{178})O_3)x$, $(Pb(Mn_{178}W_{178})O_3)y$ and $(Pb(Zn_{178}W_{178})O_3)z$, wherein x plus y plus z equal 1.

Figure 1:
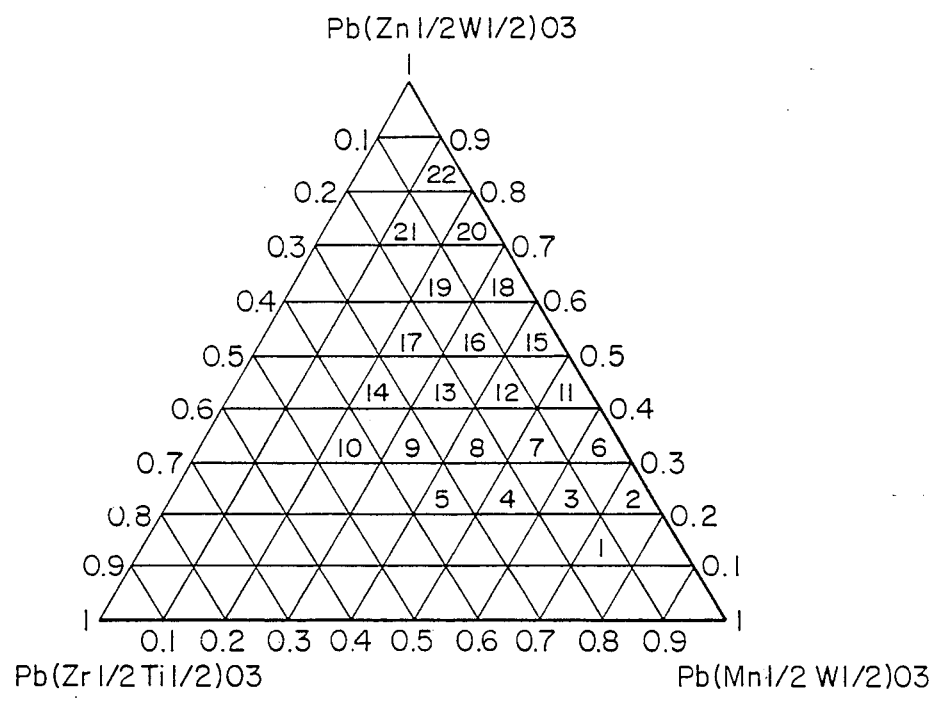
FIG. 1 shows a triangular compositional diagram for the composition according to the present invention.

The composition according to the present invention is preferably determined within the range of components illustrated by the triangular composition diagram as shown in FIG. 1. In FIG. 1, x is 0.1 to 0.5 mole fraction, y is 0.1 to 0.7 mole fraction, and z is 0.1 to 0.8 mole fraction.

The dielectric ceramic composition according to the present invention sinters below 1,000° C. and is useful as a dielectric material for laminated ceramic capacitors. Also, in order to find use as an internal electrode, the composition is simultaneously sintered with a low price metal, Ag, Ni and Cu, instead of conventional precious metals. The composition provides a dielectric composition of a three component system which is sintered at a low temperature and has high insulation resistance, a large relative dielectric constant, and a low variation of electrostatic capacity at room temperature.

Figure 2:
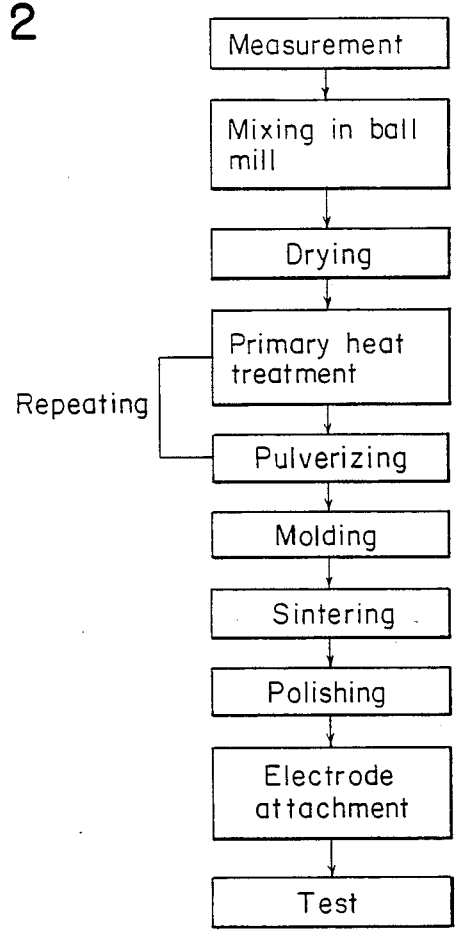
FIG. 2 shows a flow chart of the process for manufacturing a composition according to the present invention.
Figure 3:
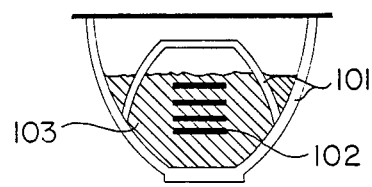
FIG. 3 is a sectional view of a crucible for sintering the composition according to the present invention.

The dielectric ceramic composition of the present invention is formed into a certain shape according to the process as seen in FIG. 2 and is sintered in a crucible as seen in FIG. 3 at below 1,000° C. for approximately four hours. The sintered product is polished, and attached to electrodes and heated for completion of the process. The condition for thermally attaching the electrodes is to heat the composition at a temperature of 500° to 1,000° C., preferably about 700° to 800° C., for one hour.

According to the present invention, the dielectric ceramic composition has a dielectric constant of above 2,800 at room temperature, a dielectric loss (tan δ) of maximum 2% or less, and a temperature variation of +22% to −50% for electrostatic capacity. The composition is sintered even below 1,000° C., and when applied as a laminated ceramic capacitor, the composition can have the conventional precious metals for electrodes replaced by a cheaper metal, such as Ag, Ni, or Al, to bring about the effect of not only greatly reducing the cost of production but also making it possible to produce laminated miniature capacitors of large capacity.

PREFERRED EMBODIMENTS

The present invention will now be described in more detail in connection with the following examples which should be considered as being exemplary and not limiting the present invention.

EXAMPLE

Metal oxides from samples PbO, $ZeO_2$, $TiO_2$, MnO and ZnO for $(Pb(Zr_{178}Ti_{178})O_3)x$, $(Pb(Mn_{178}W_{\frac{1}{2}})O_3)y$ and $(Pb(Zn_{178}W_{\frac{1}{2}})O_3)z$, wherein x plus y plus z equal 1, are measured according to the mole ratio of the components in the Table I and the ratio is $0.1 \leq x \leq 0.5$, $0.1 \leq y \leq 0.7$ and $0.1 \leq z \leq 0.8$. The measured components are mixed and pulverized with acetone in an alumina ball mill for 48 hours to produce a dispersion medium. The pulverized mixture is dried at 100° C. for over 24 hours so as to receive a primary heat treatment in an alumina crucible at 800° C. for 15 hours. The heat treated mixture is cooled at atmospheric condition and then mixed and pulverized again in an alumina ball mill for 72 hours.

The resulting repulverized mixture is formed into a disc shaped in a 16mm diameter cylinder molder under 1 ton/cm², pressure.

The molded piece is placed in a crucible, as shown in FIG. 3, and is sintered at below 1,000° C. for 4 hours and a temperature increment of 6° C./min. The sintered piece is naturally cooled at atmospheric condition, both side faces polished and a Ag paste applied before heating at 780° C. for 1 hour so as to form electrodes.

The electrodes piece is tested for its electric properties under the ASTM method with the results as shown in Table I. The temperature variation of electrostatic capacity is tested on the basis of the actual temperature 20° C. illustrated by a variation from −25° C. to 85° C.

TABLE I

| spec. No. | proportion ratio | | | relative dielectric constant (er) | dielectric loss tan (%) | Electric Features of Specimen temp. feature | | specific resistance × 10″ [Ω-cm] | sintering temp. [°C.] |
|---|---|---|---|---|---|---|---|---|---|
| | y | x | z | | | −25° C. | +85° C. | | |
| 1 | 0.7 | 0.2 | 0.1 | 2850 | 0.5 | −27 | −43 | 1.7 | 950 |
| 2 | 0.7 | 0.1 | 0.2 | 2840 | 0.5 | −33 | −41 | 1.4 | 950 |
| 3 | 0.6 | 0.2 | 0.2 | 2890 | 0.7 | −29 | −13 | 1.9 | 950 |
| 4 | 0.5 | 0.3 | 0.2 | 2980 | 1.1 | −36 | −40 | 2.5 | 960 |
| 5 | 0.4 | 0.4 | 0.2 | 3090 | 1.7 | −31 | −37 | 3.1 | 960 |
| 6 | 0.6 | 0.1 | 0.3 | 2870 | 0.5 | −35 | −29 | 1.9 | 960 |
| 7 | 0.5 | 0.2 | 0.3 | 2940 | 0.8 | −36 | −27 | 2.1 | 950 |
| 8 | 0.4 | 0.3 | 0.3 | 3070 | 1.3 | −38 | −40 | 2.9 | 960 |
| 9 | 0.3 | 0.4 | 0.3 | 3200 | 1.8 | −40 | −18 | 4.1 | 970 |
| 10 | 0.2 | 0.5 | 0.3 | 3290 | 2.0 | −36 | −38 | 4.9 | 980 |
| 11 | 0.5 | 0.1 | 0.4 | 2900 | 0.7 | −40 | −39 | 1.9 | 960 |
| 12 | 0.4 | 0.2 | 0.4 | 3010 | 1.0 | −40 | −39 | 2.7 | 950 |
| 13 | 0.3 | 0.3 | 0.4 | 3110 | 1.9 | −40 | −29 | 3.4 | 960 |
| 14 | 0.2 | 0.4 | 0.4 | 3240 | 2.0 | −29 | −23 | 4.7 | 960 |
| 15 | 0.4 | 0.1 | 0.5 | 2960 | 0.9 | −31 | −37 | 2.3 | 980 |
| 16 | 0.3 | 0.2 | 0.5 | 3070 | 1.4 | −41 | −8 | 3.0 | 960 |
| 17 | 0.2 | 0.3 | 0.5 | 3210 | 1.8 | −40 | −42 | 4.3 | 970 |
| 18 | 0.3 | 0.1 | 0.6 | 3020 | 1.0 | −33 | −40 | 2.6 | 960 |
| 19 | 0.2 | 0.2 | 0.6 | 3150 | 1.7 | −36 | −23 | 3.7 | 960 |
| 20 | 0.2 | 0.1 | 0.7 | 3070 | 1.3 | −19 | −28 | 3.0 | 960 |
| 21 | 0.1 | 0.2 | 0.7 | 3240 | 1.8 | −33 | −29 | 4.6 | 970 |
| 22 | 0.1 | 0.1 | 0.8 | 3180 | 1.7 | −40 | −30 | 3.7 | 960 |

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A dielectric ceramic composition for sintering at a low temperature for use in capacitors consisting essentially of:

a dielectric ceramic composition represented by the formula $(Pb(Zr_{\frac{1}{2}}Ti_{178})O_3)x$, $(Pb(Mn_{\frac{1}{2}}W_{178})O_3)y$ and $(Pb(Zn_{178}W_{178})O_3)z$, wherein each x, y, and z is greater than O, x plus y plus z equal 1, and x is 0.1 to 0.5 mole fraction, y is 0.1 to 0.7 mole fraction, and z is 0.1 to 0.8 mole fraction.

* * * * *